COMPACT RADIO RECEIVER

Original Filed Oct. 29, 1946

INVENTOR
PAUL ROSENBERG
BY
Pennie, Edmonds, Morton and Barrows
ATTORNEYS

Patented May 22, 1951

2,554,270

UNITED STATES PATENT OFFICE 2,554,270

COMPACT RADIO RECEIVER

Paul Rosenberg, Larchmont, N. Y., assignor to John Archer Carter, New York, N. Y.

Original application October 29, 1946, Serial No. 706,323. Divided and this application January 19, 1949, Serial No. 71,568

10 Claims. (Cl. 250—14)

This invention relates to improvements in radio receivers and especially to receivers of very small, portable type adapted to be worn on the person of the user. In accordance with the invention the radio receiver is preferably so constructed as to be substantially concealable while being worn.

The radio receiver of the invention may take various specific forms, one of which is adapted to be worn behind the ear of the user in the manner of the well-known "bone-conduction" hearing aid. The apparatus of this invention differs from that employed in hearing aids however, in that the device so worn comprises in one unit an entire radio receiver and earphone.

The invention has many applications, of which an important one is in connection with prompting and communicating systems of the nature described in my U. S. Letters Patent No. 2,475,641, granted July 12, 1949, on application Ser. No. 706,323, filed October 29, 1946, of which the present application is a division. In such systems the distances over which radio communication is required are usually relatively short.

A clearer understanding of this invention will be had from the following description taken together with the drawing, wherein:

Fig. 1 is a perspective view of one form of combination radio receiver and earphone, in accordance with the invention;

Fig 1*a* shows means supporting the radio receiver-earphone combination behind the ear in a substantially invisible manner;

Figures 1, 1A, 2, 3, 4, 5, 6, 7, 8, 9, 10:
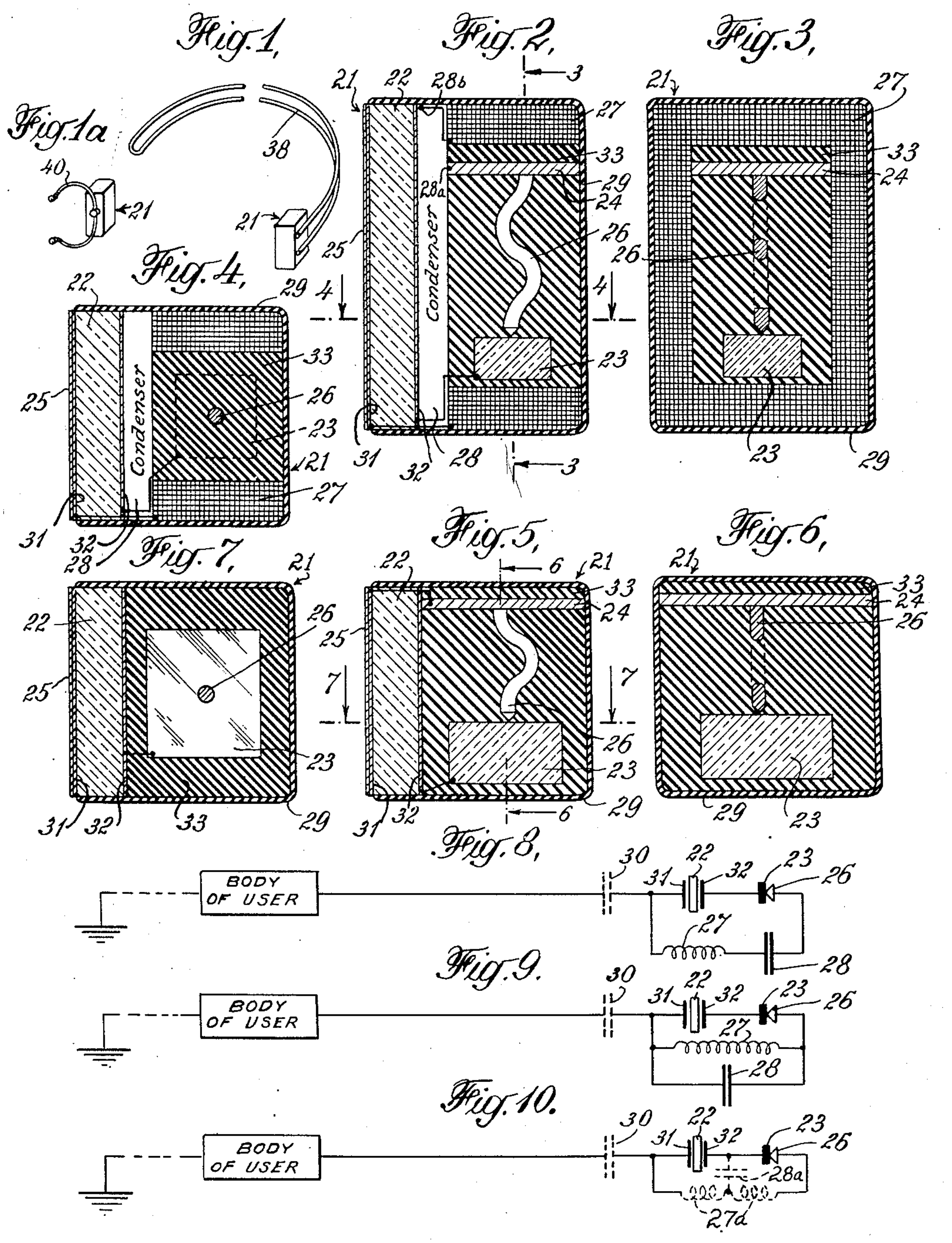
Fig. 2 is a vertical cross-sectional view showing the detailed construction of a radio receiver-earphone unit, such as represented in Figs. 1 and 1*a*, but without the headband or earclip.
Fig. 3 is a cross-sectional view taken through the line 3—3 of Fig. 2.
Fig. 4 is a cross-sectional view taken along the line 4—4 of Fig. 2.
Fig. 5 is a vertical cross-sectional view of a modified and more compact form of radio receiver-earphone unit.
Fig. 6 is a cross-sectional view taken along the line 6—6 of Fig. 5.
Fig. 7 is a cross-sectional view taken along the line 7—7 of Fig. 5.
Fig. 8 is a circuit diagram of connections of the radio receiver-earphone unit, of Figs. 2, 3 and 4.
Fig. 9 is a circuit diagram of alternative connections of the radio receiver-earphone unit of Figs. 2, 3 and 4.
Fig. 10 is a circuit diagram of connections of the radio receiver-earphone unit of Figs. 5, 6 and 7.

The complete radio receiver in one form is represented in Figs. 1 and 1*a*, as unit 21 which may be worn on a headband 38 (Fig. 1) or on an earclip 40 (Fig. 1*a*) so that the unit is pressed against the bony structure behind the ear. Alternatively, the unit may be secured behind the ear by adhesive tape, or by any other suitable means.

Referring to Figs. 2, 3 and 4; the radio receiver earphone unit 21 comprises a casing 29 which may preferably be of thin insulating material, such as a suitable plastic, which contains a complete radio receiver and earphone. The elements of this radio receiver comprise a crystal 23 having suitable detecting characteristics, such as provided by a silicon crystal, and a contact spring or cat's-whisker 26 in contact with the crystal. These two detector elements are maintained rigidly in operative relation to each other by embedding them in a suitable insulating compound, such as wax 33, which preferably should also have some vibration-absorbing characteristics. Mechanically and electrically connected to the upper end of the cats-whisker 26 is a metal anchor member 24 which contributes to the rigidity of the detector adjustment. As here shown, it is cross-shaped. The anchor member also serves in whole or in part as an electrical connection between the detector and an electrically adjacent component. Wound around the block of wax 33 is a compactly wound tuning coil 27, and positioned adjacent the detector and coil is a tuning condenser 28. Preferably the condenser structure forms a partition as shown, across the casing 29 providing a retainer for the insulating compound and an audio-vibration barrier between piezo-electric crystal 22 and the detector. The coil may be partly or wholly embedded in the material if desired, so as to comprise with the detector a solid block. The detector, coil and condenser just described together comprise a radio receiver, the cat's whisker element of the detector being electrically connected at 28*a* to one terminal of the condenser 28 and one terminal of the coil 27 being electrically connected at 28*b* to the other terminal of the condenser 28. It is assumed that the capacity of the condenser and the inductance of the coil are chosen to be resonant at the frequency to be received. Either or both may be adjustable, if required, although the usual adjusting means might increase the size of the unit to some extent. Connected to this receiver is the mentioned piezo-electric crystal 22, of well-known type, which vibrates at audio frequencies to produce sound waves when energized by electric current of audio frequency, and therefore would be placed with one face adjacent the ear. Crystal 22 is interposed between two suitable metallic electrodes 31, 32 which may comprise films of gold deposited on the surfaces of crystal 22 by electroplating, or otherwise. In the appended claims, reference to the faces of the crystal may be understood to include such films if required.

The capacity 30, shown in dotted lines, represents the inherent electrostatic capacity between the user's body and the surface of electrode 31, it being presumed that this metallic surface is coated with a suitable insulating or dielectric film 25, such as a lacquer. This inherent capacity 30 provides an electric coupling between the body of the user and the receiver proper, and normally passes sufficient high-frequency signal energy to actuate the receiver. If such insulating film be omitted, the electrode 31 will make electrical contact with the skin of the user's body in which event capacity 30 would effectively be short-circuited. In either event, the user's body, in effect, constitutes an antenna from which radio-frequency signals are connected to the radio receiver elements 23, 26, 27 and 28. The audio-frequency output signals from the receiver which actuate the piezo-electric crystal 22 cause it to vibrate and thus to reproduce speech frequencies in the ear of the user. Thus, as here utilized, crystal 22 in combination with its related elements constitutes a concealable or substantially invisible earphone.

The radio receiver-earphone unit just described in connection with Figs. 2, 3 and 4 can be made so much smaller than any heretofore proposed that it has been found possible to reduce it to dimensions and conformation permitting the unit, or most of it, to be inserted within the ear, so as to be completely, or substantially completely, concealable therein. If the unit 21 is held in place by a headband 38 comprising a wire loop, as in Fig. 1, it is possible to employ this loop, or part of it, as an antenna, depending upon the frequency of the radio signals employed. If the field strength of the received signals is sufficient, the coil 27 may intercept enough energy to produce audible sound. Otherwise, in some cases an antenna comprising a few turns of wire secured to a belt around the user's waist, for example, may be connected to the receiver unit by a wire which may be readily hidden.

The alternative embodiment shown in Figs. 5, 6, and 7 is, in general, similar to that shown in Figs. 2, 3, and 4, the difference being that the coil 27 and condenser 28 are omitted. For the reception of radio waves at ultra-high frequencies, it has been ascertained that because of the inherent inductance 27*a* and capacitance 28*a* of and between the leads and circuit components, inductance coil 27 and condenser 28 are not always required. The elimination of these two components results in a further reduction in the size of the unit, and as a result, it is even easier to make the complete radio receiver-earphone of such dimensions and conformation that the entire unit may be inserted directly within the human ear. It will be obvious that because of its extremely small dimensions, and light weight, this unit may not require the means above referred to in connection with Figs. 1 and 4 to hold it in place, although any of them may be employed, if desired.

Figs. 8 and 9 comprise two alternative circuit diagrams of connections of the elements of the radio receiver-earphone unit above described. The circuit connections are generally similar, differing only in that in Fig. 8 the tuning elements 27, 28 are in series with each other, and in Fig. 9 these elements are connected in shunt with each other. The difference is one of expediency determined largely by the frequency of the signals to which it is desired the receiver should respond. The circuit connections of the unit of Figs. 2, 3 and 4 are shown in Fig. 8 and those of Figs. 5, 6 and 7 are shown in Fig. 10.

I claim:

1. An ultra-small radio receiver-earphone combination including, as a solid, rugged unitary structure, a casing closed except for one open side, said casing containing a detector crystal element and a cat's-whisker element is substantially point contact with said crystal, a detector block of substantially solid wax-like insulating material in which both of said elements are imbedded so as to anchor said elements in permanently fixed relation, an inductance coil wound on said block of insulating material and secured to the same, a piezo-electric crystal closing the open side of said casing and having an outer face to be held against the head of the user, an electrostatic condenser unit of substantially flat form disposed between and in physical contact with the inner face of said piezo-electric crystal and the opposing face of said detector block, and electric connections between said piezo-electric crystal, said detector, said coil and said condenser.

2. An ultra-small radio receiver-earphone unit including, a casing closed except for one open side, said casing containing a detector crystal element and a cat's whisker element in contact with a surface of said crystal, a substantially solid insulating material of a type having audio-vibration-damping characteristics formed around said detector elements in contact with substantially all surfaces of said elements except those which are in contact with each other, said material comprising a solid block having one side disposed against a closed end of said casing, an induction coil wound on said block so as substantially to fill the space between the periphery of said block and the sides of said casing, a piezo-electric crystal closing the open side of said casing and having an outer face exposed, the inner face of said crystal being spaced from the side opposite said one side of said block, a condenser unit shaped and proportioned substantially to fill said last-named space to provide a vibration barrier between said piezo-electric crystal and said detector, and electric connections between said piezo-electric crystal and said detector.

3. An ultra-small radio receiver-earphone unit according to claim 2 which includes a thin metallic electrode film in contact with the outer face of said crystal, and a thin dielectric film covering said electrode film to create a radio-frequency capacitive coupling between said piezo-electric crystal and the body of the wearer of said unit.

4. A substantially concealable radio receiver and earphone combination including, as a solid, rugged, unitary structure, a casing closed except for one open side and containing a detector including a crystal and a contact element extending toward and making contact at one end with a surface of said crystal, insulating and vibration-damping material in which the elements of said detector are imbedded and are in contact over substantially their entire surfaces to form a detector block, a rigid anchor member mechanically affixed to said contact element extending laterally therefrom and being imbedded in said vibration-damping material, an electrostatic condenser of flat form disposed adjacent one side of said detector block, and an inductance coil wound around said detector block and connected to said condenser and said detector to comprise therewith a radio receiver, a piezo-electric crystal closing said open side of the casing and having an outer face to be held adjacent the head of the user, a substantial thickness of said insulating and vibration-damping material being interposed as a vibration-absorbing wall between said piezo-electric crystal and all portions of the elements of said detector to prevent sound vibrations generated by said piezo-electric crystal from disturbing the contact between the elements of said detector, and electric connections between said piezo-electric crystal and said detector.

5. A radio receiver and earphone combination according to claim 4, wherein the structure of said condenser is interposed between said piezo-electric crystal and said detector block to provide an audio-vibration barrier therebetween.

6. A substantially concealable radio receiver and earphone combination including, as a unitary structure, a casing closed except for one open side and containing a detector of the crystal contact type, insulating vibration-damping material in which the elements of said detector are imbedded and in contact over substantially their entire surfaces to form a detector block, an inductance coil wound on said block of vibration-damping material to form a rugged, compact unit therewith, connections between said detector and coil to comprise a radio receiver, a piezo-electric crystal closing said open side of said casing and having an outer face to be held against the head of the user, and connections between said piezo-electric crystal and said detector.

7. A radio receiver and earphone combination according to claim 6, wherein said insulating and vibration-damping material is of substantially solid form anchoring said detector elements in fixed relation, said coil being wound on and around said material and being impregnated therewith to form a unitary block comprising said detector and coil, said unitary block substantially filling the closed end of said casing.

8. A radio receiver and earphone combination according to claim 6, which includes a thin metallic electrode film in contact with said outer face of said piezo-electric crystal, and a thin dielectric film covering said electrode film to create radio frequency capacitive coupling between the body of the user and said electrode film, and a radio-frequency connection between said piezo-electric crystal and said detector.

9. A substantially concealable radio receiver and earphone combination, including as a solid, rugged unitary structure, a casing closed except for one open side and containing a detector of the crystal contact type, insulating vibration-damping material in which the elements of said detector are imbedded and in contact over substantial surfaces to anchor said elements in fixed relation, said material forming a solid block completely filling the closed end of said casing, a substantial thickness of said material being included between said detector elements and the surface of said block which faces the open end of said casing to provide a sound-absorbing wall therebetween, a piezo-electric crystal closing the open side of said casing, the inner face of said crystal being disposed against said last-named surface of said block so as to be separated from said detector elements by said wall, the outer face of said crystal being adapted to be held against the head of the user and being coated with a thin metallic electrode film, a thin dielectric film covering said electrode film to create radio frequency capacitive coupling with the body of the user, and a radio-frequency connection from said piezo-electric crystal to said detector.

10. A substantially concealable radio receiver and earphone combination, including as a solid, rugged unitary structure, a casing closed except for one open side and containing a detector of the crystal contact type, insulating vibration-damping material in which the elements of said detector are imbedded and in contact over substantial surfaces to anchor said elements in fixed relation, said material forming a solid block completely filling the closed end of said casing, a piezo-electric crystal closing the open end of said casing, and a wall of sound-absorbing material disposed between said piezo-electric crystal and said detector elements to separate the same and to insulate sound vibrations of said piezo-electric crystal from said detector.

PAUL ROSENBERG.

REFERENCES CITED

The following references are of record in the file of this patent:

UNITED STATES PATENTS

| Number | Name | Date |
|---|---|---|
| 1,617,236 | Csanyi | Dec. 7, 1922 |
| 1,648,521 | Wikstrom | Nov. 8, 1927 |
| 1,687,371 | Leeper | Oct. 9, 1928 |
| 2,339,173 | Koren | Oct. 14, 1940 |
| 2,283,285 | Rohlman | May 19, 1942 |